No. 858,090. PATENTED JUNE 25, 1907.
F. K. T. MEINECKE.
TOY ANIMAL.
APPLICATION FILED AUG. 16, 1906.
2 SHEETS—SHEET 2.
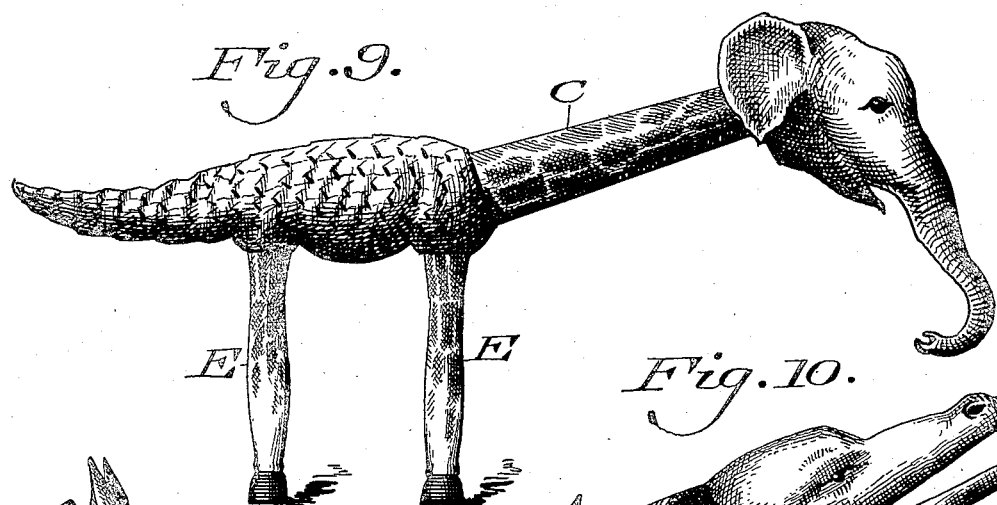
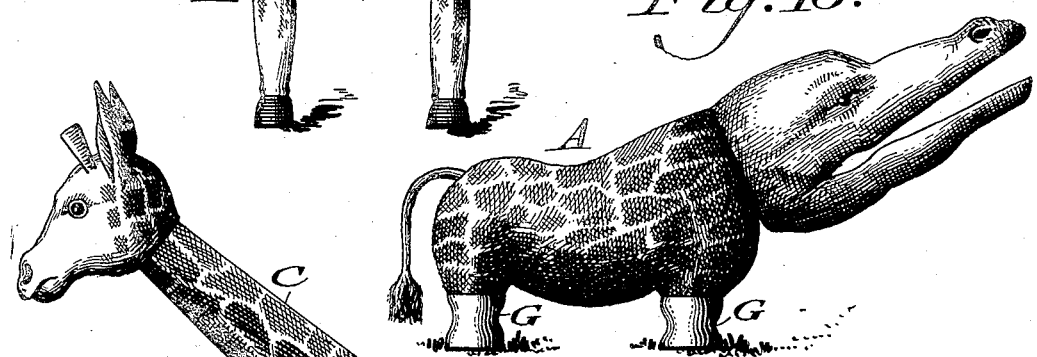
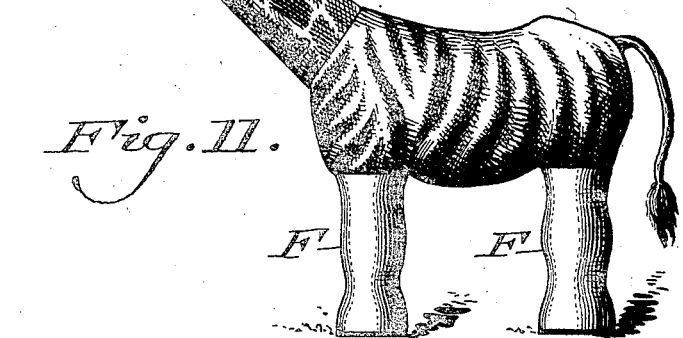
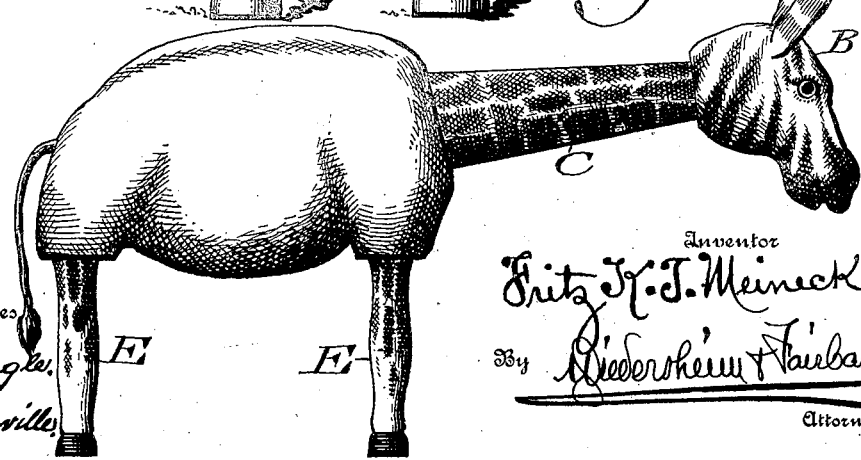

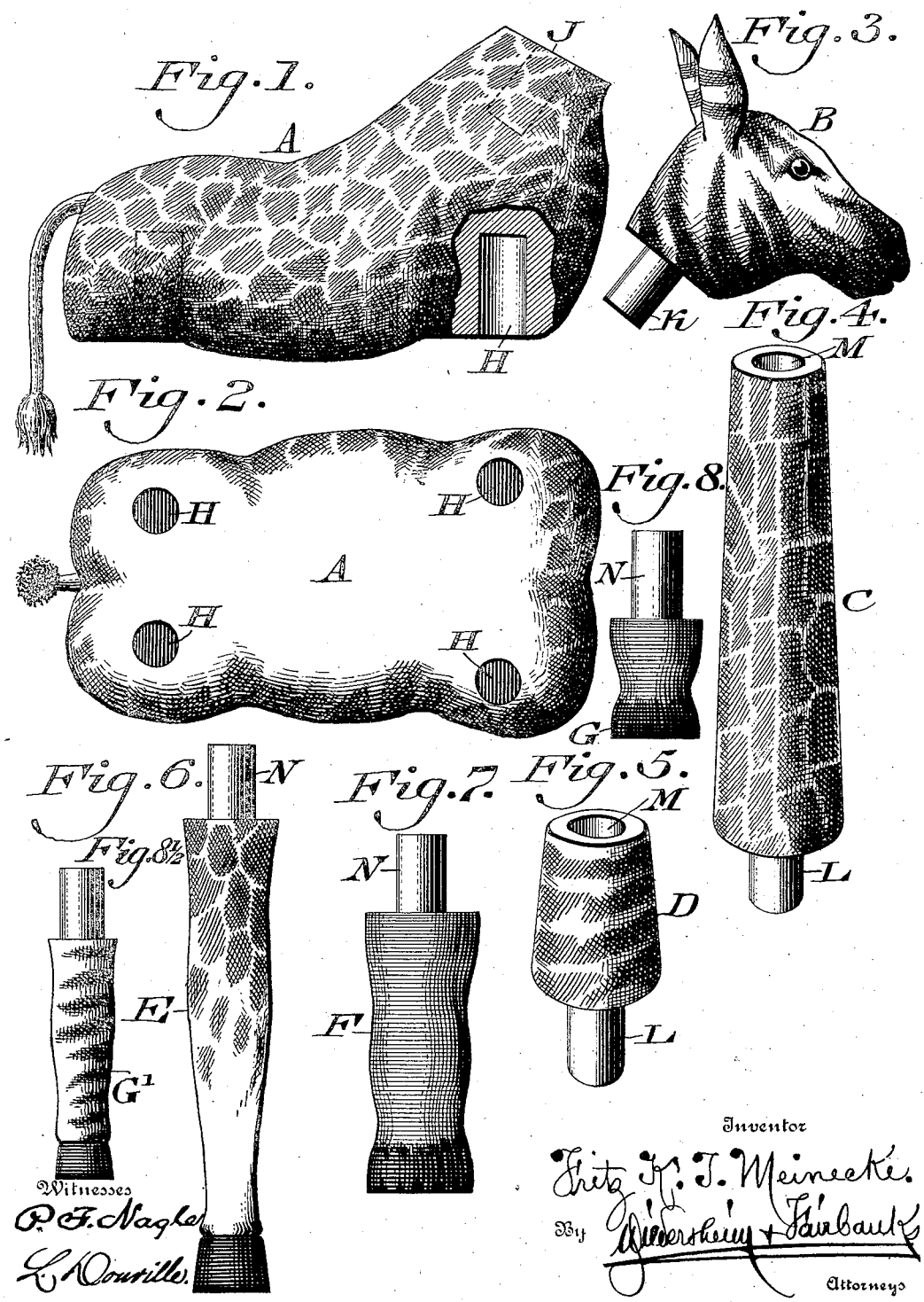

UNITED STATES PATENT OFFICE.

FRITZ K. T. MEINECKE, OF PHILADELPHIA, PENNSYLVANIA.

TOY ANIMAL.

No. 858,090.      Specification of Letters Patent.      Patented June 25, 1907.

Application filed August 16, 1906. Serial No. 330,825.

*To all whom it may concern:*

Be it known that I, FRITZ K. T. MEINECKE, a citizen of the United States, residing in the city and county of Philadelphia, State of Pennsylvania, have invented a new and useful Toy Animal, of which the following is a specification.

My invention consists of toy animals constructed of separate interchangeable parts simulating members of different animals which may be fitted to each other and produce grotesque figures and amusing metamorphoses.

Figure 1 represents a partial side elevation and partial vertical section of a toy animal embodying my invention. Fig. 2 represents a bottom plan view thereof. Fig. 3 represents a side elevation of the head of a toy animal embodying my invention. Figs. 4 and 5 represent perspective views of the necks of toy animals embodying my invention. Figs. 6, 7, 8 and 8 1/2 represent side elevations of the legs of toy animals embodying my invention. The remaining Figs. 9 to 12 represent some changes that may be made of the different members of the animals embodying my invention.

Similar letters of reference indicate corresponding parts in the figures.

Referring to the drawings: A, B, C, D, E, F, designate respectively the body, head, necks and legs of different animals, the body A being that of a zebra, the head B that of a zebra, the neck C that of a giraffe, the neck D that of a zebra and the legs E, F, G, G' those of a giraffe, elephant, alligator and zebra respectively.

The body A is formed on its under side with sockets H and in front with the socket J. The head B is formed on its back with the dowel K which may enter said socket J. The necks C, D, are formed on their lower end with the dowels L, either of which may enter said sockets, and on their upper ends with the sockets M, either of which may receive the dowel K of the head. The legs E, F, G, are formed on their upper ends with the dowels N, either set of which may enter the sockets H of the body. Each animal has its body, head, neck and legs made to simulate those of its own genus, thus the zebra has its stripes and the giraffe has its spots, and other animals some of which are apparent in Figs. 9 to 12 inclusive, will present the exterior characteristics they possess.

It will now be seen that I am enabled to change the appearance of animals by transferring the head, neck or legs of one animal to the body of another animal or by mixing, as it were, the bodies, heads, necks and legs of various animals so as to produce odd shapes, forms of which are shown in said Figs. 9 to 12, inclusive, it being evident that the dowels of different members are inserted in the sockets of other members, thus connecting the various members and retaining the relative members in position on the bodies.

It is apparent that while the toy feature of my invention is amusing, the latter is instructive of natural history in that the player can build-up the proper contour of each animal or change the same grotesque or fantastic, it being also evident that the means employed to accomplish the above are simple, practical and inexpensive.

Various changes may be made in the simulations as for instance, they may be those of insect, fish, bird or other life, without departing from the spirit of my invention.

Having thus described my invention, what I claim as new and desire to secure by Letters Patent, is:

1. A toy animal composed of a body member having sockets in its under side and a socket upon its upper side near one end, a separate head member having a dowel, a separate neck member having a socket and dowel at opposite ends, and leg members having dowels to engage the sockets in the under side of the body member.

2. A toy animal comprising a body member with a socket at its upper portion near one end, a separate neck member having a dowel at one end and a socket at the other end, and a separate head member having a dowel to fit the socket of the neck member.

3. Toy animals composed of separate body, neck, head, and leg members simulating those of different animals and dowels and sockets on said members whereby the members may be set up and connected producing the simulation of a toy animal composed of simulated members of different animals.

FRITZ K. T. MEINECKE.

Witnesses:
    JOHN A. WIEDERSHEIM,
    S. R. CARR.